April 17, 1934. A. A. BERNDT 1,955,528
CONNECTER
Filed Sept. 26, 1930
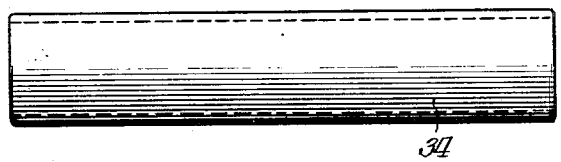
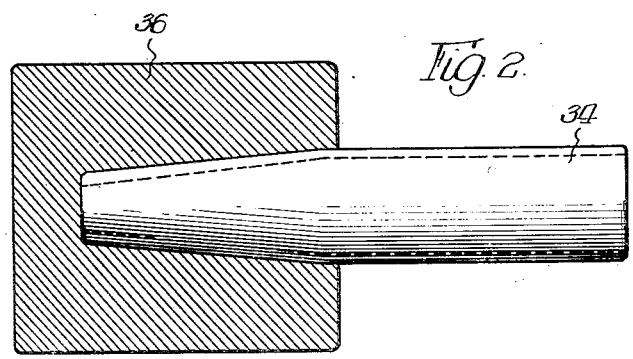
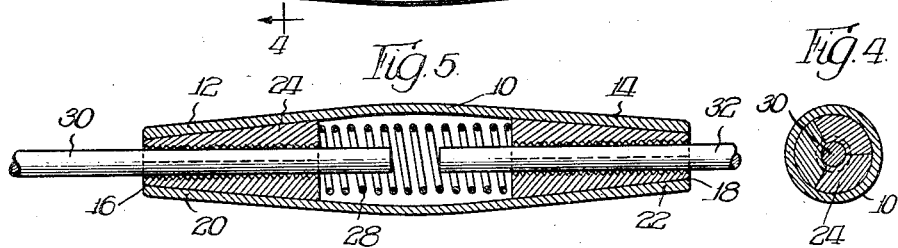
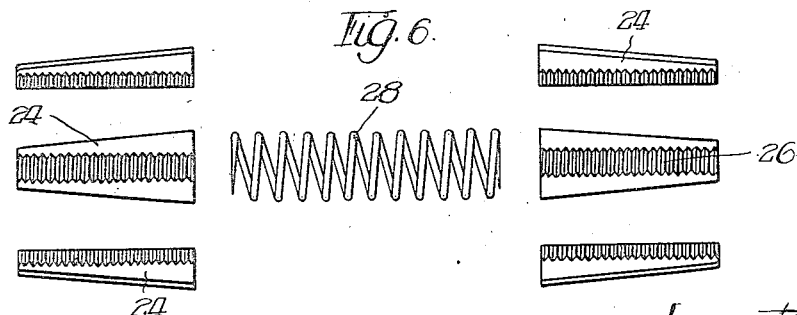
Inventor:
Arthur A. Berndt,
By Wilkinson, Huxley, Byron & Knight
Attys.

Patented Apr. 17, 1934

1,955,528

UNITED STATES PATENT OFFICE 1,955,528

CONNECTER

Arthur A. Berndt, Chicago, Ill., assignor, by mesne assignments, to Electroline Company, Chicago, Ill., a corporation of Illinois Application September 26, 1930, Serial No. 484,486

1 Claim. (Cl. 173—303)

The invention relates to electrical connecters and has reference particularly to a device for connecting electrical conductors without the use of solder or tools.

An object of the invention is to provide a connecter for joining wires and the like to thereby form a connection of high conductivity; to provide a connecter whereby conductors may be quickly and easily joined without the use of tools and which will not cut or materially injure the conductors.

Another object of the invention is to provide a connecter comprising a casing and gripping means, the casing having a formation whereby the gripping means are retained therein in operative relation so that the connecter forms a unitary device.

Yet another object is to provide a coupling for connecting wires and the like including a casing and gripping means, the casing having a formation locking the gripping means therein whereby the device is unitary having no separable parts nor screws requiring manipulation and which can easily become lost.

Yet another object is to provide a connecter of the kind described which will be simple in construction, economical to manufacture and which will meet all requirements of service and operation.

With these and various other objects in view, the invention may consist of certain novel features of construction and operation as will be more fully described and particularly pointed out in the specification, drawing and claim appended hereto.

In the drawing, which illustrates an embodiment of the device and wherein like reference characters are used to designate like parts—

Figure 1 is an elevational view of a length of tubing from which the casing of the connecter is formed;

Figure 2 is a fragmentary sectional view showing the means employed for spinning the ends of the tubing to form the tapered end portions;

Figure 3 is an elevational view showing the completed connecter;

Figure 4 is a sectional view taken along line 4—4 of Figure 3;

Figure 5 is a sectional view taken substantially through the center of the connecter and showing the gripping members in operative relation; and Figure 6 is a view showing the gripping members and the resilient member in disassembled relation.

Referring particularly to Figure 5 the connecter is shown as comprising a casing or housing 10 having tapering end portions 12 and 14 respectively and end openings 16 and 18 of a diameter substantially less than the diameter of the casing at a point substantially central of the same. For purposes which will be presently described, the cross-sectional area of the walls of the casing 10 are materially greater at points in the vicinity of 20 and 22 than the cross-sectional area of the walls intermediate these points.

Located within the casing 10 are a plurality of gripping members 24 having a wedge shaped formation, as more clearly shown in Figure 6, and which are formed with a trough or groove extending lengthwise of the members, the groove being suitably roughened by means of teeth 26. The groove formed in the members and provided with teeth is for the purpose of securely gripping the conductor wires which is accomplished by the teeth 26 embedding themselves into the surface of the wires, the teeth however being sufficiently minute so as not to sever the wires or damage the same in any manner. The gripping members 24 are formed of any suitable metal having a medium hard surface and are assembled within the casing 10 in sets of three, a set having a frusto-conical shape for engaging the inner walls of the end portions 12 and 14 respectively. It is of course, understood that the members 24 can be so formed that two or four or even five of the members would be necessary to form when assembled a complete set having a frusto-conical shape which would function in the same manner as the sets disclosed. For maintaining the sets of gripping members in spaced relation and in contact with the tapering walls a coil spring 28 is provided adapted to engage the inner surface of the members to thus force the same into engagement with the tapered walls of the end portions.

With the elements located within the casing 10, as shown in Figure 5, it is only necessary to insert a conductor 30 into the opening 16 in one end of the casing and a conductor 32 into the opening 18 at the opposite end of the casing, to thus form a solderless joint of high conductivity. It will be seen that the conductors are firmly gripped by the members 24 and any tension applied to the conductors 30 and 32 will function to increase the intensity of the gripping relationship, since the members are forced into engagement with the tapering walls of the end portions and thus further embed the teeth 26 into the surface of the conductors. The resilient member 28 functions to maintain the gripping members in operative and spaced relationship so that prior to the time the connecter is associated with conductors or wires the parts within the casing are maintained in operative relation. Also, it will be seen that the connecter comprises a unitary device having no screw threaded members to become separated and by reason of the tapered end portions the gripping members are locked within the casing so that the connecter, when once assembled, cannot get out of order and is ready for use at all times since it requires no special tools.

The casing 10 is formed from a length of metal tubing 34, as shown in Figure 1, which is imperforate and of a substantially uniform diameter throughout its length. The first step in the formation of the casing 10 is to spin one end of the tubing 34 so as to form the end portion into a tapering or frusto-conical portion and, as shown in Figure 2, this step is accomplished by the use of a suitable die or forming member 36 having an opening of tapering form, such as is required to give the necessary taper to the end portions.

An important feature resulting from the spinning operation is the increased cross-sectional area given to the walls of the casing in the vicinity of the points 20 and 22, as compared to the cross-sectional area of the walls intermediate these points. The thickened walls are located at the extreme outer ends of the casing 10 so that these portions of the casing have increased strength to withstand the strain imparted to them by the members 24, by reason of the tension placed upon the conductor wires. The spinning of the tubing 34 to produce the tapering end portions results in increasing the cross-sectional area of the casing at these points, the surplus metal being due to the fact that the diameter of the tube at its ends is materially reduced while no elongation of the same is allowed to take place, the completed casing 10 having substantially the same length as the tubing 34, from which it is formed.

The next step in the method of forming the connecter comprises inserting into the tube 34 the sets of gripping members 24 suitably spaced by the coil spring 28 and in holding the parts in operative relation, while the other end of the tubing 34 is spun in the manner as described to form this end also into a tapering end portion. Thus the completed casing, as shown in Figure 3, has the parts housed within the same and locked therein, as the diameter of the openings 16 and 18 are sufficient to prevent the members 24 from being removed from the casing.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claim.

I claim:

A connecter for connecting wires and the like comprising a casing formed from an integral piece of metal tubing, the end portions of said tubing being reduced in diameter to form tapering end portions, said casing having end openings for the insertion of wires into the casing, the walls of the end portions adjacent the openings being of increased thickness, and means housed in the casing for holding the wires against outward movement comprising, sets of wedge members located in and engaging the walls of each tapering end portion, and a coil spring located between the sets of wedge members for holding them in spaced relation and in contact with the tapering walls of the end portions.

ARTHUR A. BERNDT.